P. J. DE VRIES.
DEVICE FOR TEACHING MILKING.
APPLICATION FILED JUNE 3, 1909.

933,535.

Patented Sept. 7, 1909.

WITNESSES

INVENTOR
Peter J. De Vries
BY
ATTORNEYS

UNITED STATES PATENT OFFICE.

PETER J. DE VRIES, OF HULL, IOWA.

DEVICE FOR TEACHING MILKING.

933,535.

Specification of Letters Patent.     Patented Sept. 7, 1909.

Application filed June 3, 1909. Serial No. 499,849.

*To all whom it may concern:*

Be it known that I, PETER J. DE VRIES, a citizen of the United States, and a resident of Hull, in the county of Sioux and State of Iowa, have invented a new and Improved Device for Teaching Milking, of which the following is a full, clear, and exact description.

The expert extraction of milk from the udder of a cow requires considerable practice, and as the efforts of one who is not experienced irritate the animal, the work of learning is slow, as the cow may resist the efforts of the learner.

The purpose of this invention is to provide a novel mechanical device, that simulates the udder and teats of a cow pendent therefrom, together with other details that afford means for practicing the removal of water from the artificial udder by a proper compression of the teats, and thus acquire the art of milking quickly and safely, so as to be able to extract milk from the natural udder of a cow.

The invention consists in the novel construction and combination of parts as is hereinafter described and defined in the appended claims.

Reference is to be had to the accompanying drawings forming a part of this specification, in which similar characters of reference indicate corresponding parts in all the views.

Figure 1:
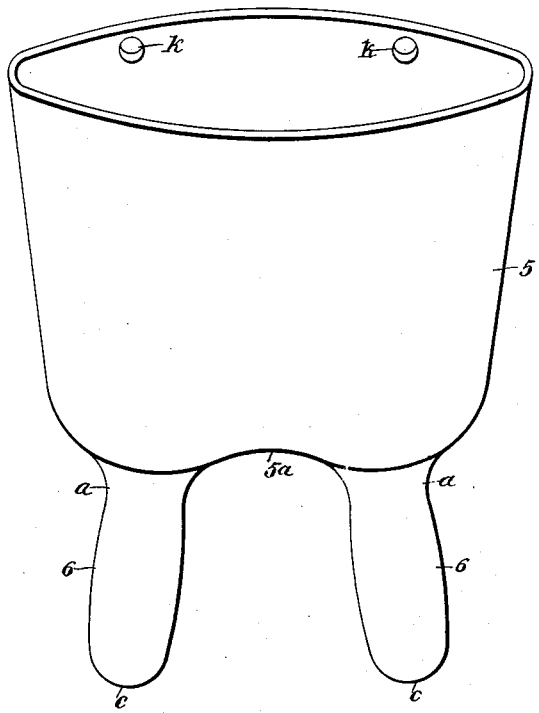
Figure 2:
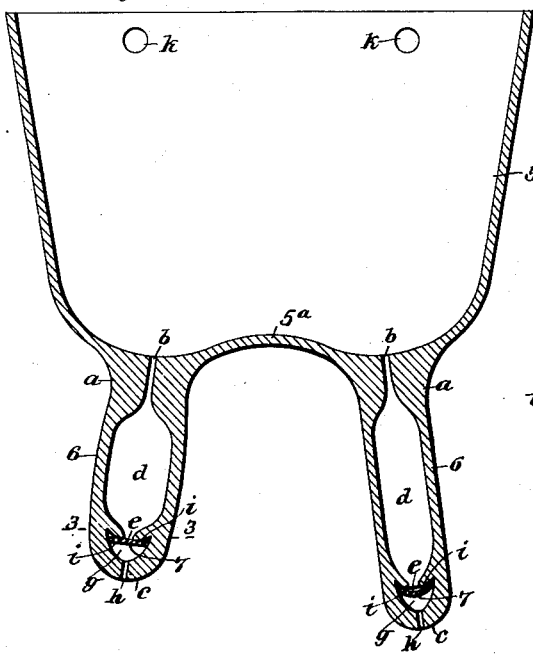
Figure 3:
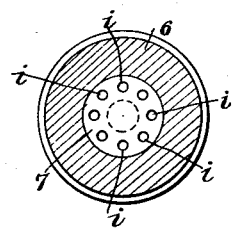

Figure 1 is a side view of the improvement; Fig. 2 is a sectional side view of the same; and Fig. 3 is a transverse sectional view of one of the pendent teats, taken substantially on the line 3—3 in Fig. 2.

In the drawings, 5 indicates an artificial udder, which as shown is in the form of a cup-like vessel or receptacle, that is open at the normally upper end and closed at the bottom by a transverse wall $5^a$. The receptacle 5 is preferably formed of waterproof, pliable material, and upon the bottom wall $5^a$ near the side wall of the receptacle, two similar diametrically opposite pendent teats 6 are formed, of proper dimensions to resemble the natural teats on the udder of a cow.

The teats 6 are of soft rubber, and are nearly cylindrical, each having a neck $a$ of slightly reduced diameter where the teat joins the bottom wall $5^a$, and as shown in Fig. 2 said bottom is concaved above each teat, so as to conduct liquid thereto. Centrally in the neck $a$ of each teat 6 a small perforation $b$ is formed, that extends toward the normally lower end $c$ thereof, and as shown at the left in Fig. 2, the perforation $b$ intersects an elongated chamber $d$ that is centrally produced in the body of the teat. The chamber $d$ is of such diameter as will render the defining side wall of the teat quite compressible, so as to simulate the yielding nature of a natural teat, and as shown said chamber terminates at a suitable distance from the extremity $c$ in a small longitudinal central passage $e$ that communicates with a cup-like valve chamber $g$.

Centrally through the lower wall of the chamber $g$ an orifice $h$ extends, affording a discharge passage for liquid through the lower end $c$ of the teat 6. A disk valve 7 is provided for each teat 6, these similar valves each consisting of a circularly edged flat planchet of rubber, having proper elasticity for effective service, and such a peripheral dimension as will adapt the valve to fit closely in the upper portion of the valve chamber, so as to normally contact with the perforated top wall thereof. The disk valve 7 for each teat 6 is furnished with a plurality of spaced small perforations $i$ that are arranged near the edge of the disk, thus leaving the space inside the circular row of perforations solid and thus adapted to normally seal the perforation $e$.

In the side wall of the vessel 5 near the upper edge thereof, two spaced perforations $k$ are formed, that will receive nails or the like which project from a stable support, such as an upright wall or post. The capacity of the vessel or receptacle 5 may with advantage be about equal with that of the udder of a cow.

To prepare for use, the device should be hung at a height that will permit the user to occupy a chair or other seat, when practicing with the same. Water being introduced within the receptacle 5, the gravity of the liquid will cause it to descend through the passages $b$ into the chamber $d$, and distend the side walls of the teats 6 if they have previously been compressed. It will be seen that the normal contact of the valves 7 with the lower surface of the upper wall of the valve chambers $g$, will prevent an escape of liquid from the chambers $d$ unless pressure is applied thereon.

To effect the operation of milking in a manner similar to that necessary for the free extraction of milk from the teats of a cow, the operator gently clasps the teats 6 with his hands, and by an increase of pressure thereon together with a downward movement of his hands, presses the liquid through the perforations *e* against the centers of the disk valves 7. The pressure thus produced on the valves 7 renders them concave on their upper sides, thus permitting the liquid to pass through the perforations *i* into the lower portions of the valve chambers *g* from which it is expelled through the discharge orifices *h*. It is customary to take hold of two teats that depend from the udder of a cow at one time, and exert milking pressure thereon alternately, relaxing pressure on one teat so as to permit it to receive milk from the udder, while the liquid is pressed out of the other one.

It will be noted in Fig. 2, at the right, that the teat 6 which has been subjected to constricting pressure of the hand is somewhat elongated, and correspondingly reduced in diameter, and further, that the valve 7 in said teat is dished slightly, thus opening the passage *e* for discharge of liquid from the perforation *h*. Upon relaxing normal pressure on the teats 6, alternately, after the liquid has been forced out of the perforations *h*, the elasticity of the side walls of the teat that pressure is removed from, will together with the downward pressure of liquid from the receptacle 5, cause the teat to resume its normal condition, as is shown at the left in Fig. 2.

While the operation seems simple, it requires dexterity and expert manipulation that can only be acquired by practice; but as the operator may use the teaching device at any time, and as long as is desired, which cannot be done when milking a cow, one may in a comparatively short time become an expert milker of the mechanical representative of a cow, and as the milking operations are exactly alike, but slight additional experience will be necessary to enable the person thus taught to properly milk a cow.

Having thus described my invention, I claim as new and desire to secure by Letters Patent:

1. A device for teaching milking, comprising a liquid holder, and a teat thereon, from which the liquid may be expelled by manipulation.

2. A device for teaching milking, comprising a liquid holder, and teats pendent thereon, from which the liquid may be expelled by manipulation.

3. A device for teaching milking, comprising a liquid holder, a hollow teat pendent thereon, from which the liquid may be expelled my manipulation, and means for controlling the discharge of liquid.

4. A device for teaching milking, comprising a supported liquid holder, a plurality of similar hollow teats pendent from the holder, and a valve in each teat adapted to control the discharge of liquid therefrom.

5. A device for teaching milking, comprising a supported liquid holder, a plurality of hollow teats pendent from and in communication with said holder, each teat having a valve chamber in the lower end thereof, and a disk valve in each chamber that is opened by compression of the teat.

6. A device for teaching milking, comprising a supported liquid holder, a plurality of hollow teats pendent from and in communication with said holder, each teat having a valve chamber in its lower portion, the top wall of which is centrally perforated, said chamber also having a discharge orifice in its lower wall, and a disk valve for each chamber, having a plurality of perforations near its edge that are adapted to be opened when manual pressure is applied to the side wall of a respective teat.

In testimony whereof I have signed my name to this specification in the presence of two subscribing witnesses.

PETER J. DE VRIES.

Witnesses:
J. S. WILSON,
D. J. VAN DER SCHAAF.